(12) United States Patent
Ishida

(10) Patent No.: US 12,220,850 B2
(45) Date of Patent: Feb. 11, 2025

(54) FREE BLEND-TYPE METAL POWDER MIXED RESIN MOLDED BODY MANUFACTURING METHOD

(71) Applicant: Daiichi Seikosha Co., Ltd., Osaka (JP)

(72) Inventor: Yasuhiko Ishida, Osaka (JP)

(73) Assignee: Daiichi Seikosha Co., Ltd., Osaka (JP)

(*) Notice: Subject to any disclaimer, the term of this patent is extended or adjusted under 35 U.S.C. 154(b) by 170 days.

(21) Appl. No.: 17/996,173

(22) PCT Filed: Apr. 14, 2021

(86) PCT No.: PCT/JP2021/015413
§ 371 (c)(1),
(2) Date: Oct. 13, 2022

(87) PCT Pub. No.: WO2021/256068
PCT Pub. Date: Dec. 23, 2021

(65) Prior Publication Data
US 2023/0219270 A1   Jul. 13, 2023

(30) Foreign Application Priority Data

Jun. 18, 2020 (JP) .................... 2020-105698

(51) Int. Cl.
*B29C 45/60* (2006.01)
*B29C 45/00* (2006.01)
(Continued)

(52) U.S. Cl.
CPC .......... *B29C 45/60* (2013.01); *B29C 45/0001* (2013.01); *B29C 45/1808* (2013.01);
(Continued)

(58) Field of Classification Search
CPC . B29C 45/0001; B29C 45/0013; B29C 45/47; B29C 45/60
See application file for complete search history.

(56) References Cited

U.S. PATENT DOCUMENTS

2004/0084795 A1* 5/2004 Hornsby ................. B01J 3/008
                                                          264/41
2017/0355119 A1* 12/2017 Nobuta ..................... B29B 7/24

FOREIGN PATENT DOCUMENTS

JP    H0471818       *  3/1992
JP    H06155536 A       6/1994
JP    H08276449 A      10/1996

OTHER PUBLICATIONS

JPH0471818 machine translation (Year: 1992).*
(Continued)

*Primary Examiner* — S. Behrooz Ghorishi
*Assistant Examiner* — Alexander A Wang
(74) *Attorney, Agent, or Firm* — Fox Rothschild LLP

(57) ABSTRACT

An object is to manufacture molded bodies having a small variation among products even if the mixture amount of a metal powder is increased when molding is performed by directly introducing not only a metal powder but also a powdered resin into an injection molding machine.
In a metal powder mixed resin molded body manufacturing method for manufacturing a molded body by kneading a molding material including a metal powder, a thermoplastic resin powder, and an additive agent, molding is performed by an injection molding machine in which a molding screw is arranged. The molding screw of the injection molding machine includes a feeding portion, a compressing portion, and a metering portion that are continuously and integrally provided, the feeding portion and the compressing portion are constituted by an one-line spiral flight, the flight of the compressing portion includes a plurality of sub-flights that extend in a spiral manner in a screw axis direction and the sub-flights each have a polygonal shape with rounded corner portions, and the sub-flights are arranged such that the corner portions are shifted by a set angle in a circumferential direction about the screw axis, and the metering portion is (Continued)

provided with a plurality of blending/aligning portions each having gear-like protrusions and recesses in a circumferential direction about the screw axis.

6 Claims, 9 Drawing Sheets

(51) Int. Cl.
*B29C 45/18* (2006.01)
*B29C 45/47* (2006.01)
*B29K 505/10* (2006.01)

(52) U.S. Cl.
CPC .......... *B29C 45/1816* (2013.01); *B29C 45/47* (2013.01); *B29C 2045/1875* (2013.01); *B29K 2505/10* (2013.01)

(56) References Cited

OTHER PUBLICATIONS

Angadi "Effects of screw configuration on the dispersion of nanofillers in the thermoset polymers" (Year: 2017).*
International Search Report issued May 25, 2021 in International Application No. PCT/JP2021/015413 (2 pages).

* cited by examiner

A-A cross-sectional view

Fig8.A

A-A cross-sectional view

B-B cross-sectional view

D-D cross-sectional view

C-C cross-sectional view

F-F cross-sectional view

E-E cross-sectional view

FREE BLEND-TYPE METAL POWDER MIXED RESIN MOLDED BODY MANUFACTURING METHOD

CROSS-REFERENCE TO RELATED APPLICATIONS

This application is a U.S. national phase application under 35 U.S.C. § 371 of International Patent Application No. PCT/JP2021/015413 filed Apr. 14, 2021, which claims the benefit of priority to Japanese Patent Application No. 2020-105698 filed Jun. 18, 2020, the disclosures of which are hereby incorporated by reference herein in their entireties.

TECHNICAL FIELD

The present invention relates to a free blend-type metal powder mixed resin molded body manufacturing method in which various mixing powders and a resin powder are directly introduced, kneaded, and melted, and thereafter injection molding is performed.

BACKGROUND ART

Many types of petroleum-based resins that have various functions have been developed, and such resins have excellent processability. For this reason, resin products are widely used in all sorts of applications in society, such as not only in electrical appliances and household appliances, but also in automobile parts and building parts. Moreover, in recent years, environment-friendly resins using natural materials such as plants are developed, and the resin products are expected to become more widespread from now on.

One method of manufacturing a desired product using resin is injection molding, in which a thermoplastic resin is melted and injected into a mold. In injection molding, usually, pellets formed into a certain shape in advance are introduced from a hopper and are melted and kneaded while being moved toward the outlet side by a screw, and thereafter the melted resin is injected into a mold for molding. With the injection molding method, even in the case of using resin materials that have various characteristics such as a melting point and viscosity, by pre-processing such resin materials into pellets that have a certain shape in advance, it is possible to perform injection molding using the same resin molding machine. The injection molding method has such features, and therefore is used to manufacture many resin molded bodies.

Moreover, in such a resin molding method, by mixing various mixtures such as an inorganic material into resin, resin molded bodies having functionalities are actively developed.

For example, there are cases where, in manufacturing lines for foods, medicinal supplies, and the like, accidents occur in which writing tools in use and caps and the like, which are parts of the writing tools, are mixed into products, due to being dropped in the manufacturing lines by mistake. Even in such cases, if the mixed object can be detected as foreign materials, quality problems can be prevented from occurring. For this purpose, a writing tool made of a resin molded body in which a metal powder having magnetism is mixed is disclosed (e.g., see Patent Document 1).

Also, most hairdressing scissors, medical scalpels, and the like need to have a complex shape and a smoothly curved surface. Heretofore, even in such a shape, these products are manufactured by a metal such as iron and steel or stainless steel. Therefore, there is a problem in that the product price increases. Regarding this problem, a method is disclosed in which a resin molded body in which tungsten is mixed into resin is manufactured, and the surface of the resin molded body is plated, and as a result, products having good usability are manufactured at low cost, even though the products have complex shapes (e.g., see Patent Document 2).

A technique for imparting an antibacterial property to a resin molded body is also being developed. For example, a method is disclosed in which remnants of copper clad laminates that are generated when printed circuit boards are manufactured are crushed, and metal powder mixed resin molded bodies are created by mixing the crushed matter into resin (e.g., see Patent Document 3).

A method of manufacturing resin molded bodies to which an antibacterial property is similarly imparted is disclosed. In this manufacturing method, first, a copper powder, a copper alloy powder, or a zinc powder is mixed into resin, as an antibacterial metal powder, and thereafter pellets are manufactured by extrusion molding. Next, various metal powder mixed resin molded bodies are manufactured by injection molding or the like using the manufactured pellets (e.g., see Patent Document 4).

Furthermore, a metal powder mixed resin molded body in which copper or a copper alloy is mixed into resin is also disclosed as a resin molded body that is superior in the antibacterial property and has external appearance durability. This is a metal powder mixed resin molded body that contains 25 to 70 wt % of a thermoplastic resin and 30 to 75 wt % of copper or a copper alloy (e.g., see Patent Document 5).

Also, a method of manufacturing reactor cores by mixing a soft magnetic metal powder into resin is disclosed. In this manufacturing method, an injection molding apparatus is provided with two input ports, namely a resin input port and a soft magnetic metal powder input port, and a resin and a soft magnetic metal powder are introduced from the respective input ports. By heating these materials inside a cylinder while being kneaded, the soft magnetic metal powder is dispersion-mixed, and is injected into a mold thereafter, and as a result, a soft magnetism metal powder mixed resin molded body is obtained (e.g., see Patent Document 6).

CITATION LIST

Patent Documents

Patent Document 1: JP 2018-012301A
Patent Document 2: WO 2018/083972
Patent Document 3: JP 1107-215812A
Patent Document 4: JP 2004-035779A
Patent Document 5: JP 2019-156903A
Patent Document 6: JP 2014-156057A

SUMMARY OF INVENTION

Technical Problem

The invention described in Patent Document 1 relates to a technique in which a metal powder having magnetism is mixed such that even if a writing tool to be used in a food manufacturing line or the like, or a part or a fragment of the writing tool is mixed into a line by mistake, the mixed object can be checked by foreign material inspection. As a specific manufacturing method, manufacturing is performed by subjecting a synthetic resin (polycarbonate resin) containing 60 wt %, as content percentage, of iron oxide powder, which is a metal powder having magnetism, to injection molding (Paragraph 0013). However, the specific gravities of the iron oxide powder and the polycarbonate resin are respectively about 5.2 and 1.2, and the difference in specific gravity is large. If 60 wt % of iron oxide powder is mixed using a conventional injection molding machine, non-uniformity in resin occurs when the resin is melted due to the difference in specific gravity, and sufficient kneading cannot be performed. As a result, a problem arises in that the variation between products increases.

Also, the invention described in Patent Document 2 aimed at replacing scissors and the like having complex shapes that are manufactured by metal, with resin molded articles. Therefore, it is necessary to obtain a use sensation and a sense of weight during use that are similar to those of the conventional metal-made articles. Therefore, a high specific gravity resin material in which 70 to 95 wt % of tungsten is mixed is molded by injection molding (Paragraph 0021). However, specific gravities of tungsten and the nylon resin are respectively about 19.3 and 1.13, and there is a large difference in specific gravity. If such a resin material including materials having large difference in specific gravity is formed into pellets, and the pellets are melted and kneaded in a screw of a conventional injection molding machine, non-uniformity arises due to the difference in specific gravity similarly to the above. As a result, a problem arises in that the variation between products and the variation in strength increases.

Furthermore, the invention described in Patent Document 3 aimed at being used as a sanitary product. A copper clad laminate is crushed to form a powder, the powder is mixed with a thermoplastic resin or the like, then molding is performed (Paragraph 0006). However, the specific gravity of copper is 8.5, and the specific gravity of a thermoplastic resin is about 1.0 to 1.2, which changes depending on the material. If such a resin material including materials having a large difference in specific gravity is formed into pellets, and an attempt is made to perform molding by a conventional injection molding machine, uniform kneading is difficult to perform. As a result, there is a problem in that the variation between products and the variation in strength increase.

Also, the invention described in Patent Document 4 aimed at obtaining a resin molded article in which an antibacterial metal powder such as copper is mixed with resin. Pellets are formed using an extrusion molding method in order to mix the antibacterial metal powder with resin, and various molding articles are manufactured using the pellets. However, a specific manufacturing method is not specifically described. If the injection molding method is used, there is a problem in that the variation between products increases, similarly to the above-described techniques.

Also, the invention described in Patent Document 5 discloses a metal powder mixed resin molded body having an antibacterial property and a manufacturing method thereof, in which a powered thermoplastic resin and powdered copper and/or copper alloy are used (Paragraph 0028, 0036). It is described that, as a method of manufacturing molded articles using these powdered materials, a known method such as injection molding, extrusion molding, blow molding, vacuum forming, or foam molding can be used (Paragraph 0052). However, in a conventional injection molding machine in which pellets are used, mixture/kneading of a thermoplastic resin powder and a metal powder is likely to be non-uniform. In particular, as the mixture amount of the metal powder increases, the non-uniformity increases, and as a result, there is a problem in that the variation between products increases.

The invention described in Patent Document 6 discloses an injection molding apparatus that is provided with an input port through which resin is introduced and an input port through which a soft magnetic metal powder is introduced, separately, and a resin powder and a soft magnetic metal powder are introduced through different input ports. Also, a manufacturing method is disclosed in which these powders are kneaded and melted in a cylinder, and then molding is performed. With this manufacturing method, although both the resin and the soft magnetic metal powder are handled in a powdered form, and an injection molding machine provided with two different input ports is used, sufficient kneading is difficult to perform, unless a proper screw shape corresponding to the difference in specific gravity between the metal powder and the resin is adopted.

That is, the conventional injection molding machines and the manufacturing methods adopt a method in which pellets are created in advance, and molding is performed after the pellets are mixed and kneaded, and the cylinder structure thereof is designed on the premise of using pellets. Therefore, there is a problem in that, if materials are introduced into a cylinder in a powder state without forming pellets, kneading of the materials having a large difference in specific gravity cannot be sufficiently performed, and the manufacturing variation increases.

An object of the present invention is to provide a technique in which, when molding is performed by introducing not only a metal in the form of a powder, but also a thermoplastic resin in the form of a powder, directly into an injection molding machine, sufficient kneading and mixture is possible, and the dispersibility of the metal powder is improved. An object of the present invention is to provide a free blend-type resin molded body manufacturing method for obtaining metal powder mixed resin molded bodies in which the variation between products is small even if the mixture amount of a metal powder is increased.

Solution to Problem

In order to solve the problems described above, a metal powder mixed resin molded body (hereinafter, simply referred to as a "molded body") manufacturing method according to the present invention is, in a method for manufacturing a metal powder mixed resin molded body by kneading a molding material including a metal powder, a thermoplastic resin powder, and an additive agent and using injection molding, characterized by performing molding by an injection molding machine in which a molding screw configured as follows is arranged. The molding screw rotates inside a cylinder of the injection molding machine, and includes a feeding portion, a compressing portion, and a metering portion that are continuously and integrally provided, and the feeding portion and the compressing portion are each constituted by an one-line spiral flight. The flight of the compressing portion includes a plurality of sub-flights that extend in a spiral manner in a screw axis direction, and the sub-flights each have a polygonal shape with rounded corner portions. The plurality of sub-flights are arranged such that the corner portions are shifted by a set angle in a circumferential direction about the screw axis, and the sub-flights are formed such that distances between an inner surface of the cylinder and the corner portions are smallest and distances between the inner surface of the cylinder and central portions between the corner portions are largest. The metering portion is provided with a plurality of blending/ aligning portions each having gear-like protrusions and recesses in a circumferential direction about the screw axis.

As a result of manufacturing molded bodies by an injection molding machine in which a molding screw having such a shape is arranged, not only can the mixture variation of a metal powder inside one molded body be reduced, but also the mixture variation of a metal powder between molded bodies that are mass-produced can be reduced.

In the manufacturing method described above, the configuration may also be such that four of the sub-flights of the compressing portion are provided, and the sub-flights are each shaped as a square as a whole, and are arranged such that the corner portions are shifted by an angle of 22.5° each in a circumferential direction about the screw axis. As a result of manufacturing molded bodies using an injection molding machine in which a screw having such a shape is arranged, the metal powder mixture variation can further be suppressed, and even if the mixture amount is increased, molded bodies having high strength and small strength variation can be manufactured.

Also, in the manufacturing method described above, the blending/aligning portions of the metering portion may have an identical shape and be arranged such that positions of the protrusions and recesses match each other. As a result of manufacturing molded bodies using an injection molding machine in which a screw having such a shape is arranged, blending and uniformization are further accelerated at the blending/aligning portions, and therefore the metal powder mixture variation can further be reduced, and even if the mixture amount is increased, molded bodies having high strength and small strength variation can be stably manufactured.

Moreover, in the manufacturing method described above, a method may also be adopted in which before introducing the molding material into a hopper of the injection molding machine, each of a metal powder, a thermoplastic resin powder, and an additive agent, which are molding materials, are metered and introduced into a mixing drum, and then the metal powder, the thermoplastic resin powder, and the additive agent are kneaded in the mixing drum in advance.

In the present invention, the molding materials are a metal powder and a thermoplastic resin powder, and because both of the molding materials are powders, uniform kneading in a mixing drum can be easily performed. As a result of introducing a metal powder and a thermoplastic resin powder that are sufficiently kneaded in advance into an injection molding hopper, and the powders being further kneaded and melted by a molding screw, uniform blending can further be promoted. As a result, the metal powder mixture variation can be further reduced.

Note that it is also effective to coat the grain surfaces of the metal powder with a silane-based material, for example. With this, adhesion between the metal powder and the thermoplastic resin powder occurs while being kneaded, and therefore uniform kneading and uniform blending are more easily performed.

Moreover, in the manufacturing method described above, one of a copper powder and an alloy powder in which copper is the main component, or a mixture material made of the copper powder and the alloy powder may also be used as the metal powder. In this case, a copper powder or an alloy powder in which copper is the main component in which 75% or more of powder grains have a grain diameter of 45 μm or less may also be used.

If the 75% or more of powder grains of the copper powder have a grain diameter of 45 μm or less, when the copper powder is mixed into the thermoplastic resin powder and kneaded, uniform kneading and uniform blending are easily performed. However, if less than 75% of grain diameter distribution is adopted, copper powder grains having relatively large grain diameters are not easily moved stably inside the screw of the injection molding machine, and therefore uniform kneading and blending are hindered. Furthermore, if the grain diameter of over 45 μm is adopted, for example, if the grain diameter of 100 μm or less, or 150 μm or less is adopted, in this case as well, the powder grains are not easily moved stably inside the screw of the injection molding machine, and therefore uniform kneading and blending are hindered. In order to stably realize uniform kneading and blending, it is preferable that 75% or more of powder grains having a grain diameter of 45 μm or less are included. Furthermore, it is more preferable to be 80% or more.

It is known that copper has an antibacterial property, and a resin molded body in which copper is mixed has already been disclosed. However, a specific method regarding the problem of manufacturing variation has not been disclosed. In the present invention, as a result of performing manufacturing using an injection molding machine in which a screw having a newly developed shape is arranged, the metal powder mixture variation not only in one molded body but also between mass-produced molded bodies is reduced. Accordingly, even if a large amount of molded bodies are manufactured, it is possible to obtain molded bodies in which the antibacterial action of copper can be stably exerted for a long period of time.

Moreover, the molded bodies of the present invention are characterized by being molded using the molded body manufacturing method described above. In the molded bodies obtained using such a manufacturing method, not only the variation in one molded body but also the mixture amount variation between mass-produced molded bodies can be reduced, compared with molded bodies manufactured with a conventional method, and therefore molded bodies having high strength and small quality variation can be manufactured, and the method can be applied to wide range of fields.

Moreover, the molded bodies having an antibacterial property of the present invention are characterized by being manufactured with the molded body manufacturing method described above using, as the metal powder, one of a copper powder and an alloy powder in which copper is the main component, or a mixture material made of the copper powder and the alloy powder.

The molded bodies manufactured with a such manufacturing method have a small metal powder mixture variation not only in one molded body but also between molded bodies, relative to molded bodies manufactured by a conventional injection molding machine, and therefore the variation in functionality that the mixed metal powder has (e.g., antibacterial property) can also be suppressed.

Note that, in the present invention, the metal powder is a concept including not only powders made of materials containing a single metal such as iron, copper, gold, silver, nickel, titanium, chromium, cobalt, aluminum, and zinc, but also powders made of alloy materials including these metals. Examples of alloys include materials that are commonly called alloys such as alloys that contain iron as the main component such as stainless steel, carbon steel, and chrome steel, alloys that contain nickel such as nichrome, alloys that contain copper such as brass, phosphor bronze, and nickel silver, alloys that contain aluminum such as duralumin, and alloys that contain titanium such as a titanium alloy. Note that the materials containing only a single metal are assumed to include not only pure metals, but also those containing other elements in a degree that is commonly recognized as impurities.

Also, the copper powder refers to not only a copper powder that is commonly called pure copper powder, but also a powder whose copper concentration is at least 90% or more. The alloy whose main constituent is copper refers to an alloy in which the component ratio of copper is highest among the alloy components, and examples thereof include brass (Cu—Zn alloy), nickel silver (Cu—Zn—Ni—Mn alloy), bronze (Cu—Sn alloy), aluminum alloy (Cu—Al alloy), and nickel (Cu—Ni—Fe—Mn alloy).

Moreover, as the thermoplastic resin powders, resin materials that can be commonly used to manufacture resin molded bodies, and can be made into powders can be used without problems, the resin materials including polypropylene (PP) and polyethylene (PE), which are olefin resins, polystyrene (PS), which is a styrene resin, polyphenylene sulfide (PPS), polybutylene terephthalate (PBT), polyamide (PA), liquid crystal polymer (LCP), and the like.

Also, the additive agents include, in general, agents for oxidative degradation prevention due to high temperature at the time of molding processing and ultraviolet exposure at the time of use, stabilizers that are added in order to maintain physical properties and the like that the resins originally have, agents for improving the mechanical strength of resin molded bodies, and function imparting agents that are added in order to impart flexibility and a fireproof property. The additive agents that are commonly used for resin molding are selected as appropriate and used, such as a phenolic material and the like, serving as an antioxidant, an ultraviolet absorbing material and the like for weatherability improvement, and a plasticizer and the like for flexibility improvement, for example. Also, a powder or liquid for improving the adhesive property between a metal powder and a thermoplastic resin is also an additive agent, and a later-described silane-based material is also one of the additive agents.

In the present invention, the free blend method refers to a method in which resin and a mixture material, both in a powder state, or a resin powder and a mixture material in a fiber state are introduced, as is, into a molding machine and molded without being pelletized in advance.

Advantageous Effects of Invention

With the molded body manufacturing method according to the present invention, molded bodies can be obtained in which, even if powder materials are used for both metal and resin such as a metal powder and a thermoplastic resin powder, the deviation of metal powders in the molded bodies that are fabricated by injection molding is small, and even when mass production is performed, the deviation in metal powder mixture amount between molded bodies is small, and with this, superior effects such as being able to stabilize the quality are exhibited. Also, the effects of being able to reduce the deviation of metal powders and suppress the quality variation are exhibited, even if the mixture ratio of a metal powder is increased.

Moreover, if copper or an alloy powder in which copper is the main component is used as the metal powder, a large amount of copper or an alloy powder in which copper is the main component can be easily added, and with this, effects such as being able to efficiently exert an antibacterial performance, and being able to exert the functionality over a long period of time are exhibited.

BRIEF DESCRIPTION OF DRAWINGS

FIG. 8A is a cross-sectional view showing, when the polygonal shape of a sub-flight provided in a flight of a compressing portion N is triangular and four sub-flights are provided in one flight, the angles of the sub-flights that are arranged in a displaced manner.

DESCRIPTION OF EMBODIMENTS

Embodiments

Figure 1A:
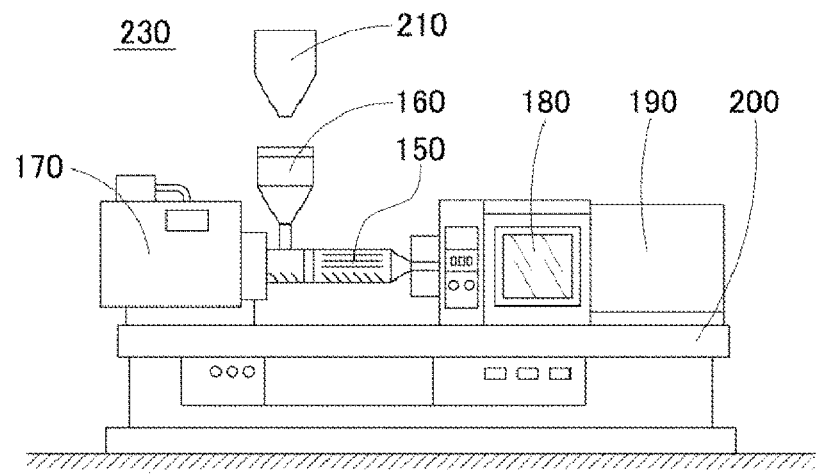
FIG. 1A is a schematic side view of an injection molding machine used in the molded body manufacturing method according to an embodiment.
Figure 1B:
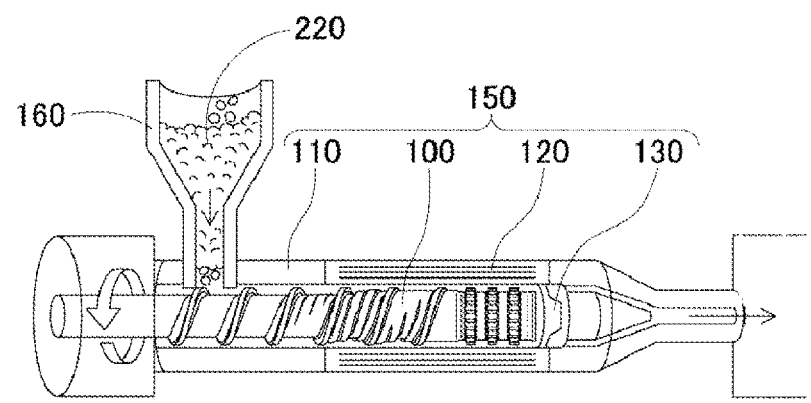
FIG. 1B is a schematic cross-sectional view of a cylinder portion in which a molding material is introduced from a hopper, and is moved to a mold while being compressed and kneaded by a molding screw, in the injection molding machine used in the manufacturing method according to the embodiment.

A molded body manufacturing method of the present invention will be hereinafter described in detail with reference to the drawings. FIG. 1A is a schematic side view of an injection molding machine used in the molded body manufacturing method according to an embodiment. FIG. 1B is a schematic cross-sectional view of a cylinder portion in which a molding material is introduced from a hopper, and is moved to a mold while being compressed and kneaded by a molding screw, in the injection molding machine used in the manufacturing method according to the embodiment.

Figure 2:
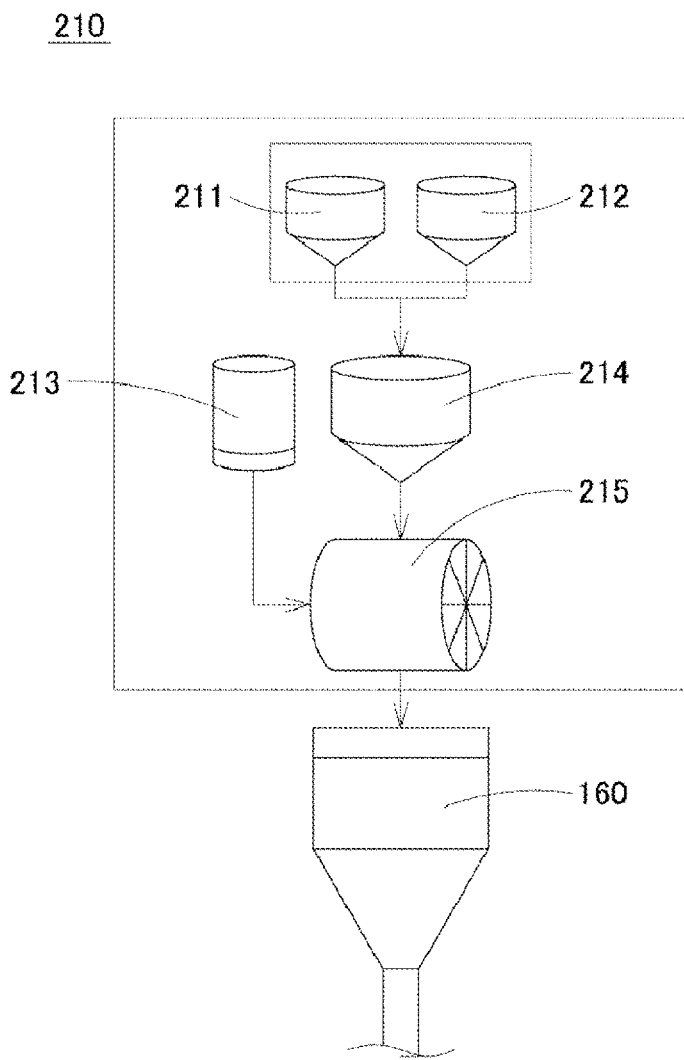
FIG. 2 is a diagram illustrating a configuration of a kneading portion used in the manufacturing method of the embodiment.

FIG. 2 is a diagram illustrating a configuration of a kneading portion used in the manufacturing method of the embodiment.

Figure 3A:
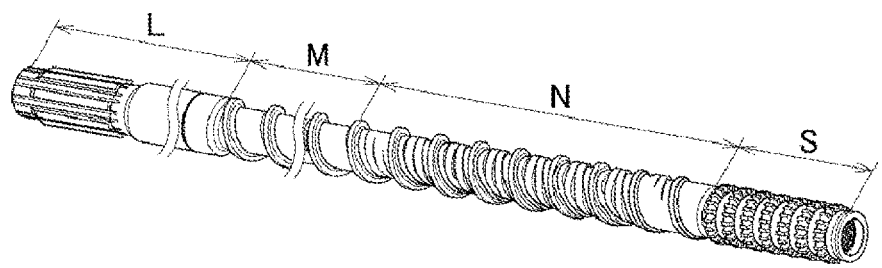
FIG. 3A is a schematic perspective view of the molding screw that is arranged in the injection molding machine used in the manufacturing method of the embodiment.
Figure 3B:
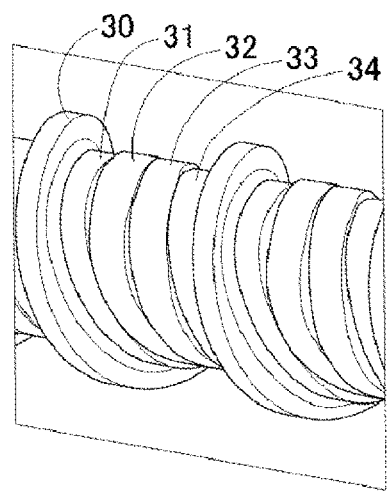
FIG. 3B is an enlarged perspective view of an A portion shown in FIG. 3A.
Figure 3C:
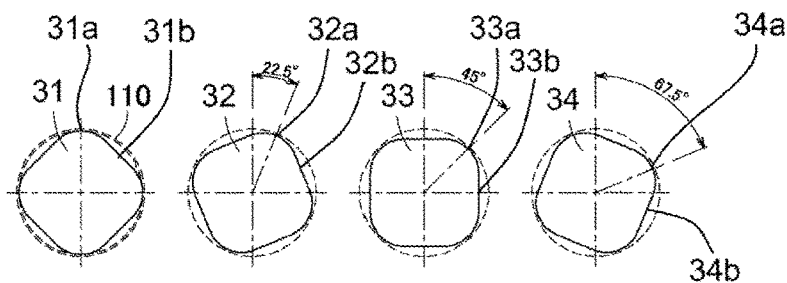
FIG. 3C is a diagram illustrating the shape of a sub-flight of a compressing portion N of the molding screw in the present embodiment.

FIG. 3A is a schematic perspective view of the molding screw that is arranged in the injection molding machine used in the manufacturing method of the embodiment. FIG. 3B is an enlarged perspective view of an A portion shown in FIG. 3A. FIG. 3C is a diagram illustrating the shape of a sub-flight of a compressing portion N of the molding screw in the present embodiment.

Figure 4A:
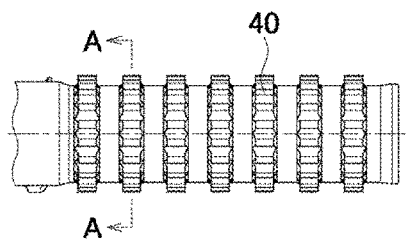
FIG. 4A is a side view of a metering portion S used in the present embodiment.
Figure 4B:
FIG. 4B is a cross-sectional view taken along line A-A shown in FIG. 4A.

FIG. 4A is a side view of a metering portion S used in the present embodiment. FIG. 4B is a cross-sectional view taken along line A-A shown in FIG. 4A.

An injection molding machine 230 used in this manufacturing method of the embodiment includes a cylinder 110 in which a heater 120 for heating the interior is arranged, a molding screw 100 rotatably provided in the cylinder 110, and a molding machine hopper 160 for introducing a molding material 220 into the cylinder 110. This machine further includes an injection portion 170 that is configured including a driving portion for rotationally driving the molding screw 100 and a back pressure applying portion for applying back pressure for pushing the molding screw toward a mold (not shown). Also, a mold (not shown), which has a cavity into which the molding material 220 having increased fluidity is injected, is provided on the leading end portion side of the molding screw 100.

Note that, in FIGS. 1A and 1B, a cylinder portion 150 includes the cylinder 110, the heater 120, a check valve 130, and the molding screw 100. The injection molding machine 230 also includes a mold clamping device 190 for opening and closing the mold and a safety window 180 for safely protecting a mold (not shown) portion, and these components are disposed together on a bed 200.

A kneading portion 210 is constituted by a resin powder introduction hopper 211 for introducing a thermoplastic resin powder, a metal powder introduction hopper 212 for introducing a metal powder, a metering hopper 214 that meters these powders, an additive agent introduction hopper 213 for introducing an additive agent, and a mixing drum 215. A thermoplastic resin powder and a metal powder are respectively introduced into the resin powder introduction hopper 211 and the metal powder introduction hopper 212, and these powders are metered by the metering hopper 214. Thereafter, these materials are input into the mixing drum 215. Here, a needed amount of additive agent is also introduced from the additive agent introduction hopper 213. Then, these materials are kneaded by the mixing drum 215.

Accordingly, the molding material 220 is uniformly mixed when being introduced into the molding machine hopper 160, and a state is entered in which the metal powder is adhered to the thermoplastic resin powder by the additive agent. Therefore, even if the metal powder is a powder made of various metal materials such as an iron powder, a copper powder, and a copper alloy powder, a further uniformly blended state can be achieved as a result of the metal powder being kneaded and melted inside the molding screw. Note that the metal powder may be surface-coated by a silane-based material before being introduced into the metal powder introduction hopper. Performing coating is effective for obtaining uniformity, because the adhesive property with a resin powder can be improved.

As shown in FIG. 3A, the molding screw 100 includes a feeding portion M for feeding the molding material 220 and the compressing portion N and the metering portion S that extend continuously from the feeding portion M, and the feeding portion M and the compressing portion N are respectively constituted by one-line spiral flights 20 and 30. Note that the molding screw 100 also includes a shaft portion L having a shaft 10 for connecting the molding screw 100 to the back pressure applying portion and the driving portion in the injection portion 170.

The compressing portion N is provided with sub-flights, as shown in FIGS. 3B and 3C. Four sub-flights 31, 32, 33, and 34 are provided in the compressing portion N, and the sub-flights 31, 32, 33, and 34 are each shaped as a square, as a whole, and are arranged such that the rounded corner portions thereof are shifted by angles of 22.5° each in a circumferential direction about the screw axis. Note that, in the present embodiment, a configuration is illustrated in which seven flights 30 are arranged in the compressing portion N, but the number of flights is not limited to seven. The number of flights may be changed depending of the material of the metal powder, the grain diameter distribution, and the like.

As shown in FIGS. 4A and 4B, the metering portion S has a configuration including seven blending/aligning portions 40 having the same shape that are provided such that the positions of the protrusions and recesses match each other, but the number of the blending/aligning portions 40 is not limited to seven. The number of the blending/aligning portions 40 may be changed depending on the material of the metal powder, the grain diameter distribution, and the like. In the blending/aligning portion 40, protrusion portions 41 and recess portions 42 are provided along a circumferential direction, and form a gear shape, as a whole.

In the molding screw 100, in regions where the distance between the cylinder 110 and the sub-flights 31, 32, 33, and 34 is small (the gaps between the corner portions 31*a*, 32*a*, 33*a*, and 34*a* and the inner surface of the cylinder 110), the molding material is subjected to stronger compressive force and the melted thermoplastic resin flows more quickly. On the other hand, in regions where the distance is large (the gaps between the bottom portions 31*b*, 32*b*, 33*b*, and 34*b* of the sub-flights 31, 32, 33, and 34 and the inner surface of the cylinder 110), the molding material is subjected to less compressive force and moves more slowly.

In general, the difference in specific gravity is large between a metal powder and a thermoplastic resin powder. For example, the specific gravity of a copper powder is 8.5, and the specific gravity of a thermoplastic resin powder is about 1.1. It is requested that powders having specific gravities that are largely different, as described above, one of the powders being not meltable, are uniformly blended. In the screw of the present embodiment, the gaps between corner portions 31*a*, 32*a*, 33*a*, and 34*a* of the sub-flights 31, 32, 33, and 34 and the inner surface of the cylinder 110 are small, and therefore, in these regions, as a result of a compressive force being applied and receiving heat from the heater 120, the thermoplastic resin powder is melted, the viscosity thereof decreases, and the melted powder flows faster than the metal powder. However, in regions in which the gaps are large, the thermoplastic resin flows slowly, and mixture with the metal powder is promoted. In this way, as a result of proving regions in which the thermoplastic resin flows fast, and regions in which the thermoplastic resin flows slowly, uniform blending with the metal powder is realized.

As a result of adopting such a manufacturing method, uniform blending is realized in both the case where a small amount of a metal powder is mixed and the case where a large amount of a metal powder is mixed. Therefore, the variation in the metal powder mixture amount of molded bodies obtained by injection molding can be suppressed. That is, not only is the metal powder distribution in one molded body made uniform, but also, when a large amount of molded bodies are manufactured, the variation in the metal powder mixture amount between the molded bodies can be reduced.

First Working Example

In the following, a specific manufacturing method and a molded article when a copper powder is used as the metal powder will be described.

In this working example, as the copper powder, a copper powder (pure copper) created using a water atomization method was subjected to screen sizing, and the resultant copper powder in which 80% or more of the grains have diameters of 45 µm or less was used (manufactured by Fukuda Metal Foil & Powder Co., Ltd.). Copper powder mixed molded bodies were manufactured while changing the copper powder mixture amount from 10 to 60 wt %. Polypropylene (PP) was used as the thermoplastic resin.

The copper powder, the polypropylene powder, and an additive agent were kneaded in the kneading portion 210 in advance, and thereafter the resultant material was introduced into the hopper 160 of the injection molding machine 230, and was kneaded by the molding screw 100, and thereafter molded bodies were manufactured. Six types of molded bodies were manufactured in which 10, 20, 30, 40, 50, and 60 wt % of copper powder were respectively mixed, and a molded body made of only polypropylene (PP) (that is, the copper powder mixture amount is 0 wt %) was also manufactured as a comparative example.

(1) Measurement of Variation in Copper Powder Mixture Amount of Molded Bodies

With respect to the six types of molded bodies having different mixture amounts, the variation in copper powder mixture amount in each molded body, and the variation in mixture amount between the molded bodies were studied. With respect to the variation in copper powder mixture amount between molded bodies, 1000 pieces of molded bodies were manufactured over a plurality of days for each of the types of molded bodies having different mixture amounts, 300 pieces were extracted from the 1000 pieces, weights thereof were measured, and the variation was evaluated by the variation in weight.

Also, with respect to the variation in copper powder mixture amount in a molded body, 30 pieces were extracted, each molded body was cut at 10 positions, the cross sections thereof were observed by a microscope, the number of copper powder grains were counted, and the variation was evaluated by the average value and the variation regarding the number of copper powder grains at 10 cross sections. Note that the observation was made at the same magnification, a range about 1,000 µm was photographed, and the number of copper powder grains included in the range was obtained for each cross section. Here, grains that were overlapped and were too small to be determined were excluded.

Regarding the variation in copper powder mixture amount in one molded body, in all of the molded bodies whose copper mixture amount is 10 wt % to 60 wt %, the variation between 10 cross sections is ±1% or less, and the variation between 30 pieces of molded bodies is also ±1% or less. Also, when the variation in copper powder mixture amount between molded bodies was obtained by weight measurement, it is confirmed that the variation in weight between 300 pieces is ±1% or less.

With this, it was confirmed that, when a copper powder is mixed and molded, even if the copper powder mixture amount ratio relative to a thermoplastic resin powder differs, the variation in mixture amount can be reduced, and molded bodies that are high in quality stability and superior in reliability can be manufactured.

(2) Antibacterial Characteristic of Copper Powder Mixed Resin Molded Body (2-1) Evaluation of Elution Characteristic of Copper Ion into Water Containers in which 10 wt % to 60 wt % of copper powders were respectively mixed were molded, water was poured into the containers, and the copper ion concentration in water was measured over 20 days. Moreover, with respect to the molded bodies whose copper mixture amount was 20 wt % and 60 wt %, water was poured into the containers, and the change in copper ion concentration in water was measured over a long period of time, while exchanging water every week.

Figure 5:
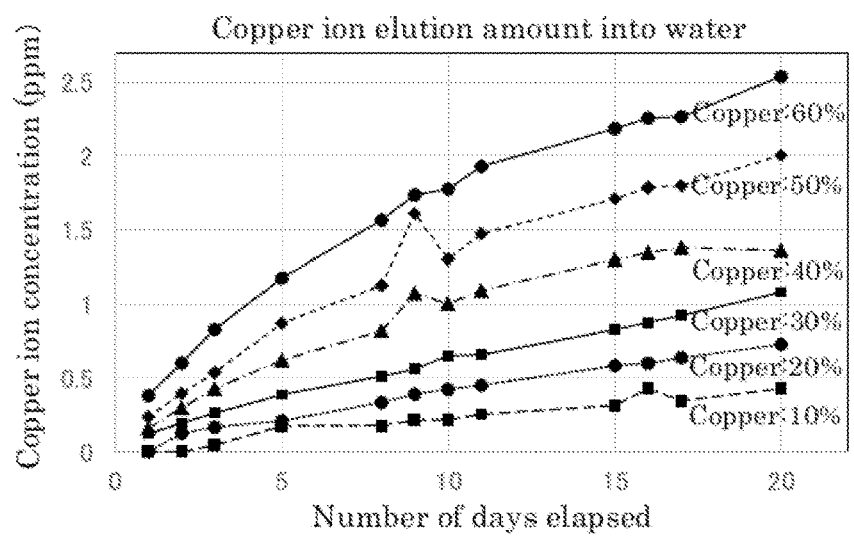
FIG. 5 shows a result of obtaining the change in copper ion concentration in water when left for 20 days without exchanging water while changing the copper powder mixture amount, in a first working example of the present embodiment.

FIG. 5 shows a result of obtaining the change in copper ion concentration in water when left for 20 days without exchanging water while changing the copper powder mixture amount. In the case where the copper powder mixture amount is 10 wt %, it is confirmed that copper ions are not detected for about two days, but thereafter copper ions are detected, and the concentration thereof gradually increases. Also, it is confirmed that as the ratio of the copper powder mixture amount increases, the copper ion concentration in water increases, and in the case of 30 wt % or more, copper ions are detected from the first day.

Figure 6:
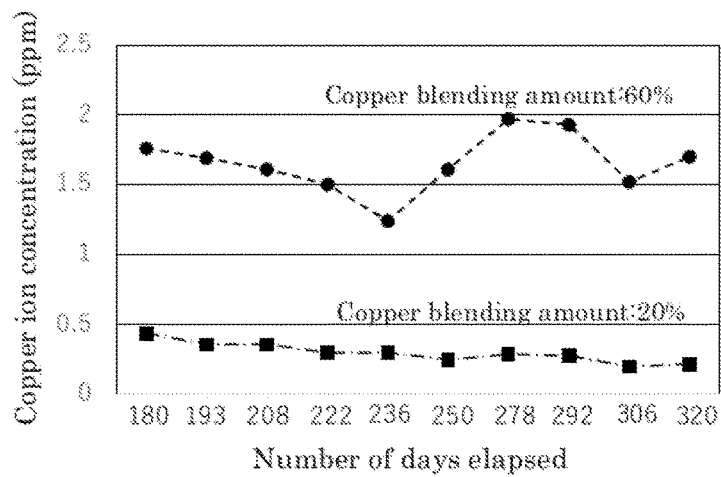
FIG. 6 shows a result of obtaining the long-term detectability of copper ion concentration while exchanging water every week, for the copper powder mixture amounts of 20 wt % and 60 wt %, in the first working example.

FIG. 6 shows a result of obtaining the long-term detectability of copper ion concentration while exchanging water every one week, for the copper powder mixture amounts of 20 wt % and 60 wt %. When the copper powder mixture amount is 60 wt %, a relatively high copper ion concentration is detected even after 320 days. Also, regarding a mixture article of 20 wt %, a tendency that the copper ion concentration gradually decreases is observed, but even after 320 days has passed, copper ions can be detected. From these results, it is confirmed that from the molded body manufactured in the present embodiment, copper ions are continuously eluted over a long period of time.

(2-2) Measurement of Bactericidal Effect of Copper Ions in Water

Based on the measurement result of copper ion elution amount into water, the results obtained by studying the bactericidal effect with respect to mycete (fungus), *Escherichia coli*, and common bacteria (miscellaneous bacteria) are shown in Tables 1 to 3. The test method is as follows. Molded body containers whose copper powder mixture amount is 10 wt % to 60 wt % were created, water and a bacterial solution are poured into these containers, and the number of CFUs (colony-forming units) of bacteria was measured. Also, a resin alone molded article made of only polypropylene was created as a comparative example, and a comparative evaluation was performed.

Table 1 shows a result regarding mycete, and it is confirmed that, in the case where copper mixture amount is 0 wt %, that is, in the case of polypropylene 100%, fungus remains even after 11 days has passed, but in the case of a molded body in which 10 wt % or more of copper is mixed, the number of CFUs is 0 when two days have passed, and sterilization is achieved. Note that, in the molded articles of 10 wt %, 20 wt %, and 30 wt %, 120 CFUs, 1 CFU, and 1 CFU are respectively detected when six days have passed, and these are considered to be due to contamination. Also, it is conceivable that, instead of the number of CFUs first becoming 0 when two days have passed, the number of CFUs becomes 0 at an earlier timing, but it is not clear because measurement is not performed at an intermediate timing.

TABLE 1

| | | Number of days elapsed | | | | | | |
|---|---|---|---|---|---|---|---|---|
| | | 0 | 2 | 3 | 4 | 6 | 9 | 11 |
| Copper blending amount (%) | 0% | 1000 | 1000 | 1000 | 1000 | 1000 | 600 | 600 |
| | 10% | 1000 | 0 | 0 | 0 | 120 | 0 | 0 |
| | 20% | 1000 | 0 | 0 | 0 | 1 | 0 | 0 |
| | 30% | 1000 | 0 | 0 | 0 | 1 | 0 | 0 |
| | 40% | 1000 | 0 | 0 | 0 | 0 | 0 | 0 |
| | 50% | 1000 | 0 | 0 | 0 | 0 | 0 | 0 |
| | 60% | 1000 | 0 | 0 | 0 | 0 | 0 | 0 |

Note:
Copper blending amount is shown in wt %. Numbers in the table indicate CFU (pieces). Used resin is polypropylene (PP). Test results on mycete.

Table 2 shows a result of studying *Escherichia coli*. In the case of *Escherichia coli*, if the mixture amount is 40 wt % or more, the number of CFUs becomes 0 in two days, and sterilization is achieved. However, it is understood that, when the mixture amount is less than 40 wt %, at least four days or more are needed.

TABLE 2

| | | Number of days elapsed | | | | | | |
|---|---|---|---|---|---|---|---|---|
| | | 0 | 2 | 3 | 4 | 6 | 9 | 11 |
| Copper blending amount (%) | 0% | 1000 | 1000 | 1000 | 1000 | 1000 | 1000 | 1000 |
| | 10% | 1000 | 1000 | 500 | 18 | 100 | 0 | 0 |
| | 20% | 1000 | 200 | 6 | 0 | 12 | 0 | 0 |
| | 30% | 1000 | 12 | 5 | 0 | 7 | 0 | 0 |
| | 40% | 1000 | 0 | 0 | 0 | 0 | 0 | 0 |
| | 50% | 1000 | 0 | 0 | 0 | 0 | 0 | 0 |
| | 60% | 1000 | 0 | 0 | 0 | 0 | 0 | 0 |

Note:
Copper blending amount is shown in wt %. Numbers in the table indicate CFU (pieces). Used resin is polypropylene (PP). Test results on *Escherichia coli*.

Also, Table. 3 shows a result of studying common bacteria. In the case of common bacteria, even in a case of 60 wt %, the number of CFUs is 10 when two days have passed, and becomes 0 when four days have passed. Also, when taking a look at the days needed for the number of CFUs to become 0, the number of days is 14 days in the case of 20 wt %, 9 days in the case of 30 wt %, 6 days in the case of 40 wt %, 6 days in the case of 50 wt %, and 4 days in the case of 60 wt %. It is found out that as the copper powder mixture amount ratio increases, the bactericidal effect regarding common bacteria increases.

TABLE 3

| | | Number of days elapsed | | | | | | | | | |
|---|---|---|---|---|---|---|---|---|---|---|---|
| | | 0 | 2 | 3 | 4 | 6 | 9 | 11 | 14 | 18 | 20 |
| Copper blending amount (%) | 0% | 1000 | 1000 | 1000 | 1000 | 1000 | 1000 | 1000 | 1000 | 1000 | 1000 |
| | 10% | 1000 | 1000 | 1000 | 1000 | 1000 | 1000 | 400 | 500 | 200 | 150 |
| | 20% | 1000 | 1000 | 1000 | 400 | 200 | 2 | 10 | 0 | 0 | 0 |
| | 30% | 1000 | 500 | 50 | 10 | 30 | 0 | 0 | 0 | 0 | 0 |
| | 40% | 1000 | 10 | 8 | 1 | 0 | 0 | 0 | 0 | 0 | 0 |
| | 50% | 1000 | 2 | 2 | 3 | 0 | 0 | 0 | 0 | 0 | 0 |
| | 60% | 1000 | 10 | 10 | 0 | 0 | 0 | 0 | 0 | 0 | 0 |

Note:
Copper blending amount is shown in wt %. Numbers in the table indicate CFU (pieces). Used resin is polypropylene (PP). Test results on common bacteria.

As a result of comprehensively considering these results, it is confirmed that, in order to effectively express the bactericidal effect in a short period of time, it is desirable that at least 40 wt % or more of copper is mixed, and it is further preferable that 50 wt % or more of copper is mixed.

(2-3) Measurement of Surface Bactericidal Effect of Copper Powder Mixed Molded Body Two types of molded body, namely a molded body whose copper powder mixture amount is 30 wt % and a resin-only molded article made of 100% of polypropylene, were manufactured, a bacterial solution was disseminated on these surfaces, and the reproductive state of bacteria was studied over a period of time. The types of bacteria of the bacterial solution are three types, namely common bacteria (miscellaneous bacteria), *Escherichia coli*, and mycete (fungus). 1 mL of bacterial solution was disseminated on each spot, and the time when the water including bacteria on the surface was dried was set as the sterilization test start time.

Figure 7A:
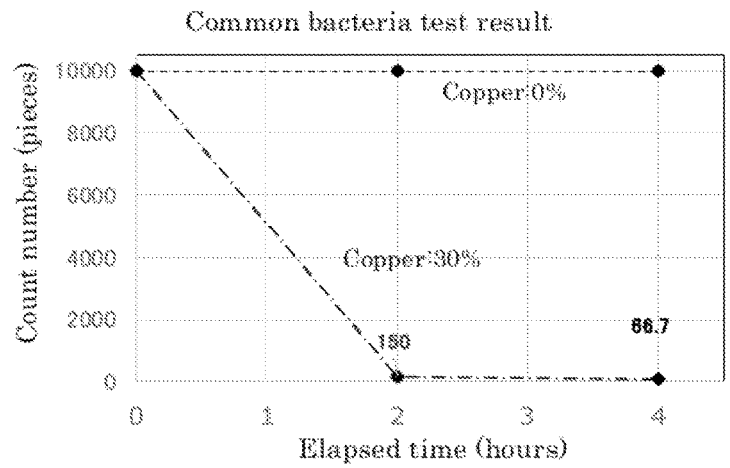
FIG. 7A is a diagram illustrating a test result regarding a surface bactericidal effect for common bacteria, in the first working example.
Figure 7B:
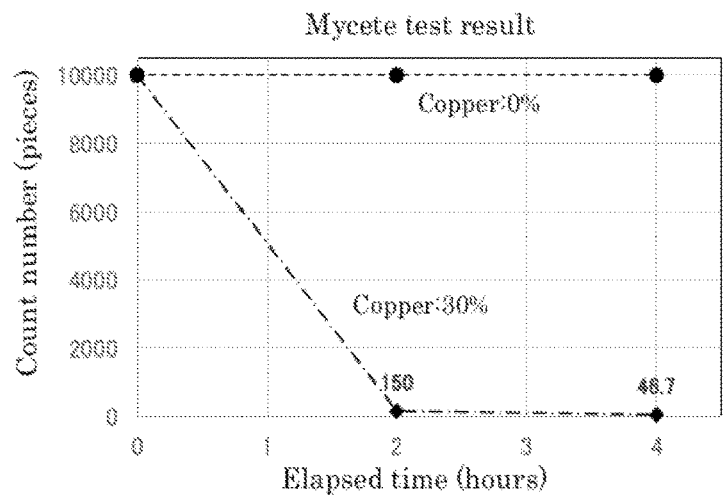
FIG. 7B is a diagram illustrating a test result regarding a surface bactericidal effect for mycete, in the first working example.
Figure 7C:
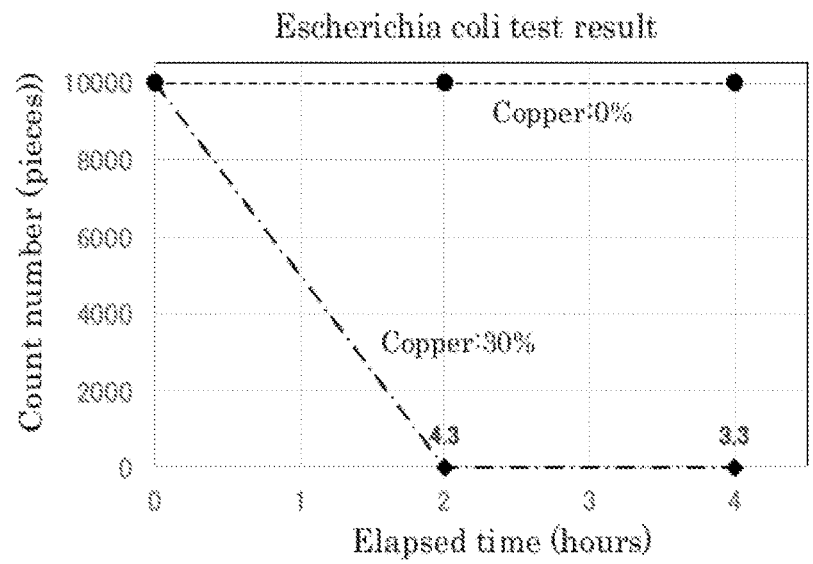
FIG. 7C is a diagram illustrating a test result regarding a surface bactericidal effect for *Escherichia coli*, in the first working example.

FIG. 7A is a diagram illustrating a test result regarding a surface bactericidal effect for common bacteria. FIG. 7B is a diagram illustrating a test result regarding a surface bactericidal effect for mycete. FIG. 7C is a diagram illustrating a test result regarding a surface bactericidal effect for *Escherichia coli*. The vertical axis shows the CFU (colony-forming unit) count number, and the horizontal axis shows the elapsed time.

Regarding the resin-only molded article made of 100% of polypropylene, the bactericidal action is not observed with respect to all types of fungus. On the other hand, regarding the molded body whose copper powder mixture amount is 30 wt %, the count number largely decreases when two hours have passed, and it is confirmed that the bactericidal effect can be obtained.

Based on these results, with respect to the bactericidal effect, it is understood that it is desirable that the copper powder mixture amount is 30 wt % or more, is more preferably 40 wt % or more, and is further more preferably 50 wt % or more, in order to obtain a more favorable effect. According to this manufacturing method, molded bodies whose copper powder mixture amount exceeds 60 wt % can be easily manufactured. However, there is a problem in that, as the copper powder mixture amount increases, the weight of the molded body increases, and the cost thereof increases. In the case where these constraints are not present, uniform blending inside a molded body and between molded bodies can be realized up to about 90 wt %, and molded bodies having a stable strength can be obtained.

Note that although a copper powder was used in this working example, the present invention is not limited to the copper powder. An alloy powder containing copper may also be used, because copper ions are generated from an alloy including copper. A similar antibacterial effect can be obtained by using powders of alloys such as brass (Cu—Zn alloy), nickel silver (Cu—Zn—Ni—Mn alloy), bronze (Cu—Sn alloy), aluminum alloy (Cu—Al alloy), and nickel (Cu—Ni—Fe—Mn alloy). Furthermore, a mixed powder of a copper powder and an alloy powder containing copper may also be used.

Even if these powders have a shape such as an indeterminate form shape, a flake shape, or a spherical shape, if the sub-flight shape of the compressing portion of the screw, the number of flights, and the shape, the arrangement number, and the like of the blending/aligning portions of the metering portion are set according to the shape of the powder, metal powder mixed resin molded bodies that are small in variation and are uniformly blended can be manufactured.

Also, the manufacturing method of the copper powder and the alloy powder is not limited to the water atomization method in this working example, and the powders can be manufactured using a gas atomization method, an electrolysis method, a crushing method, and the like. Moreover, the copper powder and the alloy powder may also be manufactured from waste material or remnants using a crushing method.

As products that use the antibacterial action of copper, applications to a shaft body of a writing tool to be used in a hospital or the like, and applications to a wash stand, a shower head, a door push plate, a doorknob, a handrail, and a wall and a floor of a treatment room are effective, for example, but applications to home-use articles are also possible. Moreover, applications to many fields in which antibacterial action is needed are possible, such as applications to a vase and various containers in order to prevent occurrence of mosquito larva, slime, and the like, tongs that are used by various persons in a smorgasbord in a restaurant and in a bread shop and the like, a triangular sink tidy, a chopping board, and the like that are used in a home kitchen, hold-on straps of a train, a handle portion of a shopping basket of a supermarket, and portions of an escalator, and elevator, and the like that are to be touched by hands. Note that the molded bodies in which a copper powder and a copper alloy powder are mixed, in the present embodiment, include molded bodies having flexibility, in addition to bodies in a rigid state.

Second Working Example

Next, a manufacturing method of a molded body in which a metal powder other than the copper powder is mixed, and the manufactured molded body will be described. In this working example, a SUS powder-mixed metal powder mixed resin molded body was manufactured using a molding material that includes 46.7 wt % of acrylonitrile butadiene styrene (ABS) resin powder, as the thermoplastic resin powder, 50 wt % of stainless steel (SUS) powder, as the metal powder, and 3.3 wt % of an additive agent. Note that the SUS powder used in this working example was manufactured by subjecting a waste material to crush processing, and a SUS powder in which 75% or more of powder grains have grain diameter of 50 μm or less was used.

The above-described molding material was introduced into the hopper 160 of the injection molding machine 230 in which the molding screw 100 is arranged, which is described in the first working example, and manufacturing was performed under the same conditions as those of the copper powder.

The properties of the manufactured molded body are as follows. The specific gravity is 3.6, the tensile strength is 90 MPa, the bending strength is 112 MPa, the Charpy impact strength is 18.5 kJ/m2. Also, the variation is studied by manufacturing a large amount of molded bodies as in the case of the first working example. Similar results as those of the first working example are obtained regarding the variations inside a molded body and between molded bodies.

The molded body manufacturing method of the present invention is not limited to using the screw shape described in the embodiment, and a machine may also be used in which one of the number of flights of the compressing portion N, the number of sub-flights and the polygonal shape thereof, the number of blending/aligning portions in the metering portion S, and the shapes/numbers/lengths in the screw axis direction of the gear-like protrusions and recesses in the blending/aligning portion are changed. For example, various sub-flight shapes of the compressing portion N shown in FIGS. 8A to 8C, and various shapes of the blending/aligning portion in the metering portion S shown in FIGS. 9A to 9H may also be used in combination.

FIG. 8A is a cross-sectional view illustrating the shape of the sub-flights provided in the flight of the compressing portion N, and angles when the sub-flights are arranged shifted in a circumferential direction of the screw axis. In FIG. 8A, the sub-flights are each triangular as a whole, and four sub-flights are provided in one flight, and the four sub-flights are arranged shifted by angles of 30° each in the circumferential direction of the screw axis.

Figure 8B:
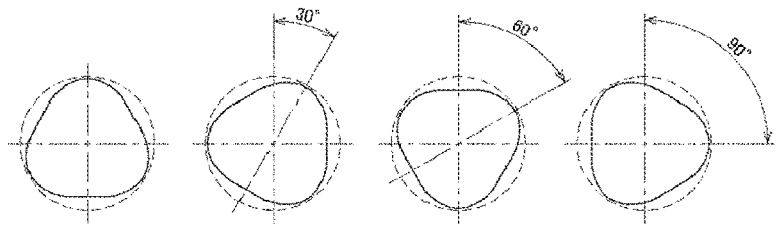
FIG. 8B is a cross-sectional view showing, when the polygonal shape of a sub-flight provided in a flight of the compressing portion N is quadrilateral and four sub-flights are provided in one flight, the angles of the sub-flights that are arranged in a displaced manner.
Figure 8B:
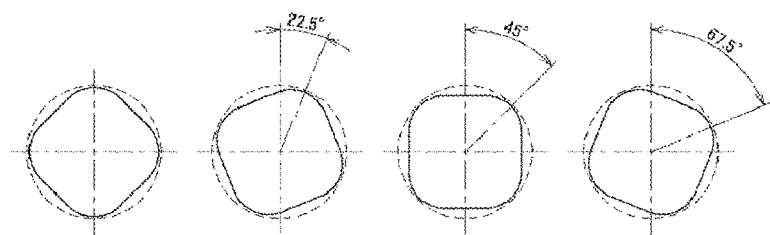

FIG. 8B is a cross-sectional view illustrating the angles when each sub-flight is quadrilateral as a whole, four sub-flights are provided in one flight, and the four sub-flights are arranged shifted by angles of 22.5° each in the circumferential direction of the screw axis. These sub-flights are the same as those used in the present embodiment.

Figure 8C:
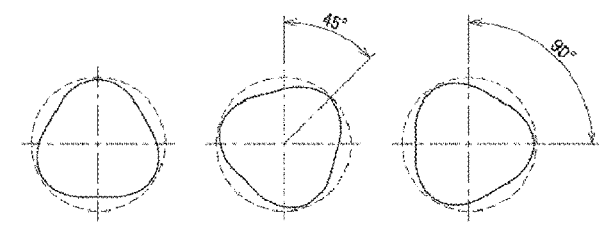
FIG. 8C is a cross-sectional view showing, when the polygonal shape of a sub-flight provided in a flight of the compressing portion N is triangular and three sub-flights are provided in one flight, the angles of the sub-flights that are arranged in a displaced manner.

FIG. 8C is a cross-sectional view illustrating the angles when the polygonal shape of a sub-flight is triangular, three sub-flights are provided in one flight, and the sub-flights are arranged while being shifted. In this case, the sub-flights are arranged shifted by angles of 45° each.

Note that, in FIGS. 8A to 8C, an equilateral triangle and a square as a whole are described as the shape of the sub-flights, but the present invention is not limited to those shapes. For example, the shape may be a regular pentagon or a regular hexagon. The polygonal shape referred in the present invention is a concept including an equilateral triangle to a regular octagon.

Figure 9A:
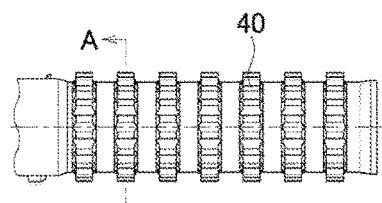
FIG. 9A is a side view illustrating a configuration, with respect to a blending/aligning portion of a metering portion S of the molding screw, in which seven blending/aligning portions having the same shape are provided such that positions of the protrusions and recesses match each other.
Figure 9B:
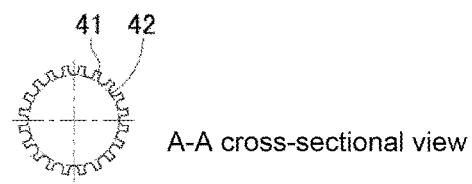
FIG. 9B is a cross-sectional view taken along line A-A shown in FIG. 9A.

FIG. 9A is a side view illustrating a configuration in which seven blending/aligning portions having the same shape are provided such that positions of the protrusions and recesses match each other. FIG. 9B is a cross-sectional view taken along line A-A shown in FIG. 9A. This shape is the same as that of the blending/aligning portion used in the present embodiment.

Figure 9C:
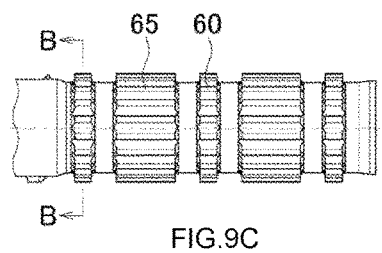
FIG. 9C is a side view illustrating a configuration, with respect to the blending/aligning portions of the metering portion S of the molding screw, in which a total of five blending/aligning portions that have different lengths in the screw axis direction are arranged alternatingly such that positions of the protrusions and recesses match each other.
Figure 9D:
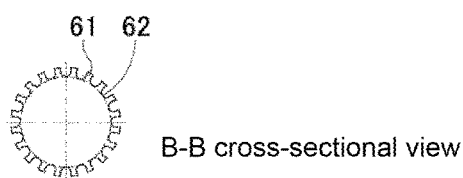
FIG. 9D is a cross-sectional view taken along line B-B shown in FIG. 9C.

FIG. 9C is a side view illustrating a configuration in which a total of five blending/aligning portions 60 and 65 that have different lengths in the screw axis direction are arranged alternatingly such that positions of the protrusions and recesses match each other, and FIG. 9D is a cross-sectional view taken along line B-B shown in FIG. 9C. Protrusion portions 61 and recess portions 62 are provided at a fixed pitch along a circumferential direction, and form a gear shape as a whole.

Figure 9E:
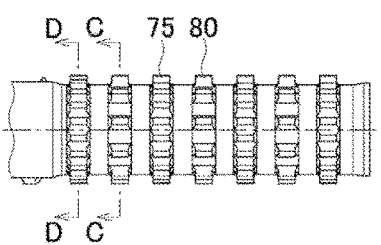
FIG. 9E is a side view illustrating a configuration, with respect to the blending/aligning portions of the metering portion S of the molding screw, in which seven blending/aligning portions that have different numbers of protrusions and recesses are arranged alternatingly.
Figure 9F:
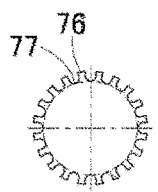
FIG. 9F is a cross-sectional view taken along line D-D shown in FIG. 9E.
Figure 9G:
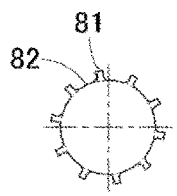
FIG. 9G is a cross-sectional view taken along line C-C shown in FIG. 9E.

FIG. 9E is a side view illustrating a configuration in which seven blending/aligning portions 75 and 80 that have different numbers of protrusions and recesses are arranged alternatingly. FIG. 9F is a cross-sectional view taken along line D-D shown in FIG. 9E, and FIG. 9F is a cross-sectional view taken along line C-C shown in FIG. 9E. The number of protrusion portions 81 of the blending/aligning portion 80 is smaller than the protrusion portions 76 of the blending/aligning portion 75. The recess portions 81 of the blending/aligning portions 80 are wider than the recess portions 77 of the blending/aligning portions 75.

Figure 9H:
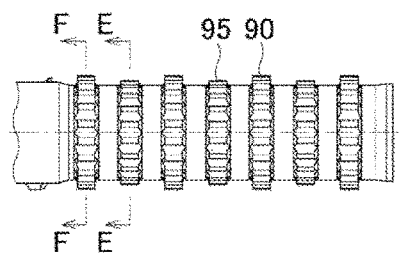
FIG. 9H is a side view illustrating a configuration, with respect to the blending/aligning portions of the metering portion S of the molding screw, in which seven blending/aligning portions that have the same number of protrusions and recesses but have different protrusion/recess heights and that are arranged alternatingly are arranged such that positions of the protrusions and recesses match each other.
Figure 9J:
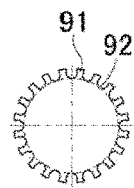
FIG. 9J is a cross-sectional view taken along line F-F shown in FIG. 9H.
Figure 9K:
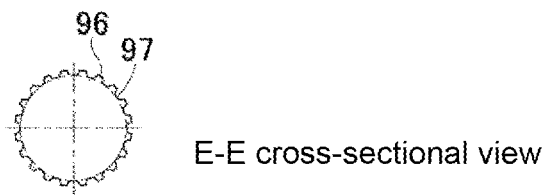
FIG. 9K is a cross-sectional view taken along line E-E shown in FIG. 9H.

FIG. 9H is a side view illustrating a configuration in which seven blending/aligning portions 90 and 95 that have the same number of protrusions and recesses but have different protrusion/recess heights and that are arranged alternatingly are arranged such that positions of the protrusions and recesses match each other. FIG. 9J is a cross-sectional view taken along line F-F shown in FIG. 9I1, and FIG. 9K is a cross-sectional view taken along line E-E shown in FIG. 9H. The height of the protrusion portions 91 of the blending/aligning portions 90 is smaller than the height of the protrusion portions 96 of the blending/aligning portions 95, but the recess portions 92 of the blending/aligning portions 90 and the recess portions 97 of the blending/aligning portions 95 are set such that the bottom portions of the recess portions 92 and 97 are located at the same distance from the center.

For example, when a powder of very hard metal such as tungsten is used, it is better to use a combination between sub-flights having a shape shown in FIG. 8B and blending/aligning portions having shapes shown in FIG. 9H. Also, when a powder of alloy having a relatively low melting point such as an alloy made of indium and tin is used, it is better to use a combination between sub-flights having a shape shown in FIG. 8C and blending/aligning portions having shapes shown in FIG. 9E. Moreover, when a powder of narrow fiber-like metal is used, it is better to use a combination between sub-flights having a shape shown in FIG. 8B and blending/aligning portions having shapes shown in FIG. 9C.

As described above, as a result of selecting a combination between sub-flights shown in FIG. 8A to FIG. 8C and blending/aligning portions shown in FIGS. 9A to 911 according to the material, shape, and grain size distribution of the metal powder, high quality molded bodies with less variation can be obtained.

Industrial Applicability

According to the molded body manufacturing method of the present invention, even if various metal powders that are different in shape, grain diameter distribution, material, and the like, are used, the variation in metal powder mixture amount inside a molded body and the variation in metal powder mixture amount between molded bodies can be reduced, and molded bodies having small quality variation can be manufactured even in a case of mass production. Moreover, uniform blending is possible, and therefore, even if the mixture amount of a metal powder is increased, molded bodies having high strength and small strength variation can be manufactured. Also, because a sense of weight and feeling of touch similar to a metal material can be obtained, and furthermore an antibacterial property can be improved as in the case of using a copper powder, this manufacturing method is useful in wide variety of fields such as a medical field, household articles, and building articles.

LIST OF REFERENCE NUMERALS

10 Shaft
20, 30 Flight
31, 32, 33, 34 Sub-flight
31a, 32a, 33a, 34a Corner portion
31b, 32b, 33b, 34b Bottom portion
40, 60, 65, 75, 80, 90, 95 Blending/aligning portion
41, 61, 76, 81, 91, 96 Protrusion portion
42, 62, 77, 82, 92, 97 Recess portion
100 Molding screw
110 Cylinder
120 Heater
130 Check valve
150 Cylinder portion
160 Hopper
170 Injection portion
210 Kneading portion
211 Resin hopper
212 Mixture material hopper 213 Additive agent hopper
214 Metering hopper
215 Mixing drum
220 Molding material
230 Free blend injection molding machine
L Shaft portion
M Feeding portion
N Compressing portion
S Metering portion

The invention claimed is:

1. A metal powder mixed resin molded body manufacturing method for manufacturing a metal powder mixed resin molded body comprising the steps of:
kneading a molding material including a metal powder, a thermoplastic resin powder, and an additive agent and using injection molding,
wherein molding is performed by an injection molding machine in which a molding screw is arranged,
the molding screw rotates inside a cylinder of the injection molding machine, and includes a feeding portion, a compressing portion, and a metering portion that are continuously and integrally provided, the feeding portion and the compressing portion being constituted by an one-line spiral flight,
the flight of the compressing portion includes a plurality of sub-flights that extend in a spiral manner in a screw axis direction, and the sub-flights each have a polygonal shape with rounded corner portions,
the plurality of sub-flights are arranged such that the corner portions are shifted by a set angle in a circumferential direction about the screw axis, the sub-flights are formed such that distances between an inner surface of the cylinder and the corner portions are smallest and distances between the inner surface of the cylinder and central portions between the corner portions are largest, and
the metering portion is provided with a plurality of blending/aligning portions each having gear-like protrusions and recesses in a circumferential direction about the screw axis.

2. The metal powder mixed resin molded body manufacturing method according to claim 1,
wherein four of the sub-flights of the compressing portion are provided, and
the sub-flights are each shaped as a square as a whole, and are arranged such that the corner portions are shifted by an angle of 22.5° each in a circumferential direction about the screw axis.

3. The metal powder mixed resin molded body manufacturing method according to claim 1,
wherein the blending/aligning portions of the metering portion have an identical shape and are arranged such that positions of the protrusions and recesses match each other.

4. The metal powder mixed resin molded body manufacturing method according to claim 1,
wherein, before introducing the molding material into a hopper of the injection molding machine,
each of a metal powder, a thermoplastic resin powder, and an additive agent,
which are molding materials, are metered and introduced into a mixing drum, and
then the metal powder, the thermoplastic resin powder, and the additive agent are kneaded in the mixing drum in advance.

5. The metal powder mixed resin molded body manufacturing method according to claim 1,
wherein one of a copper powder and an alloy powder in which copper is the main component, or a mixture material made of the copper powder and the alloy powder is used as the metal powder.

6. The metal powder mixed resin molded body manufacturing method according to claim 5,
wherein the copper powder or the alloy powder in which copper is the main component that is to be used is a powder in which 75% or more of the powder has a grain diameter of 45 μm or less.

* * * * *